United States Patent [19]

Marin

[11] 4,067,818

[45] Jan. 10, 1978

[54] DUST LAYING

[75] Inventor: Pierre Dominique Marin, Rouen, France

[73] Assignee: Exxon Research and Engineering Company, Linden, N.J.

[21] Appl. No.: 760,832

[22] Filed: Jan. 21, 1977

[30] Foreign Application Priority Data

Jan. 22, 1976 United Kingdom ................. 2488/74

[51] Int. Cl.$^2$ .......................... C09K 3/22; E01H 3/00; E21F 5/06; E21F 5/18
[52] U.S. Cl. ......................................... 252/88; 55/84; 252/353; 260/505 A; 299/12; 404/76
[58] Field of Search ................ 252/88, 539, 558, 353; 260/505 A, 505 E; 55/1, 220, 84, DIG. 41; 98/50; 299/12; 404/76

[56] References Cited

U.S. PATENT DOCUMENTS

| 2,467,132 | 4/1949 | Hunt | 260/505 A |
|---|---|---|---|
| 2,617,772 | 11/1952 | Keenan | 252/558 |
| 2,646,361 | 7/1953 | Rostler | 252/88 X |
| 2,786,815 | 3/1957 | Buggisch | 252/88 |
| 3,690,727 | 9/1972 | Degginger | 299/12 |

FOREIGN PATENT DOCUMENTS

| 448,760 | 5/1948 | Canada | 252/88 |
|---|---|---|---|
| 2,288,775 | 5/1976 | France | 252/88 |
| 1,000,766 | 1/1957 | Germany | 252/88 |
| 677,279 | 8/1952 | United Kingdom | 252/88 |

Primary Examiner—Dennis L. Albrecht
Attorney, Agent, or Firm—Frank T. Johmann

[57] ABSTRACT

An aqueous dust laying formulation containing up to 2% by weight of an alkyl orthoxylene sulphonate the alkyl group containing from 8 to 11 carbons.

5 Claims, 2 Drawing Figures

DUST LAYING

The present invention relates to improvements in or relating to dust laying especially in coal mines and is particularly concerned with novel formulations that may be sprinkled in dusty areas to lay the dust.

It is known to lay dust in coal mines to improve working conditions and reduce the toxicological risks and explosion hazards. It has been proposed that the dust may be layed by spraying the dusty areas with water containing surfactants. United Kingdom Pat. No. 677279 describes the use of aqueous systems containing alkyl benzene sulphonates in which the alkyl group contains from 10 to 12 carbon atoms. We have found that although this type of system can be used it does not have especially good wetting power and that comparatively large amounts of surfactant are needed to obtain the desired wetting. We have surprisingly found that certain aqueous systems containing similar aryl sulphonates have improved wetting power compared to those proposed in British Pat. No. 677279 thus allowing less surfactant to be used.

The wetting power is a measure of the extent to which the dust-laying composition spreads over the surface of the dusty area, (i.e. the coal) thus increasing the extent to which the dust is laid. The greater the wetting power of the composition the greater the dust laying effect for the same amount of composition which is of course economically important. Thus, by using surfactants with a greater wetting effect we may achieve the same power from a composition containing less surfactant which is also economically important.

The present invention therefore provides a formulation for laying dust comprising water containing up to 2% by weight of a salt of an alkyl orthoxylene sulphonic acid in which the alkyl group contains from 8 to 11 carbon atoms.

Figure 1:
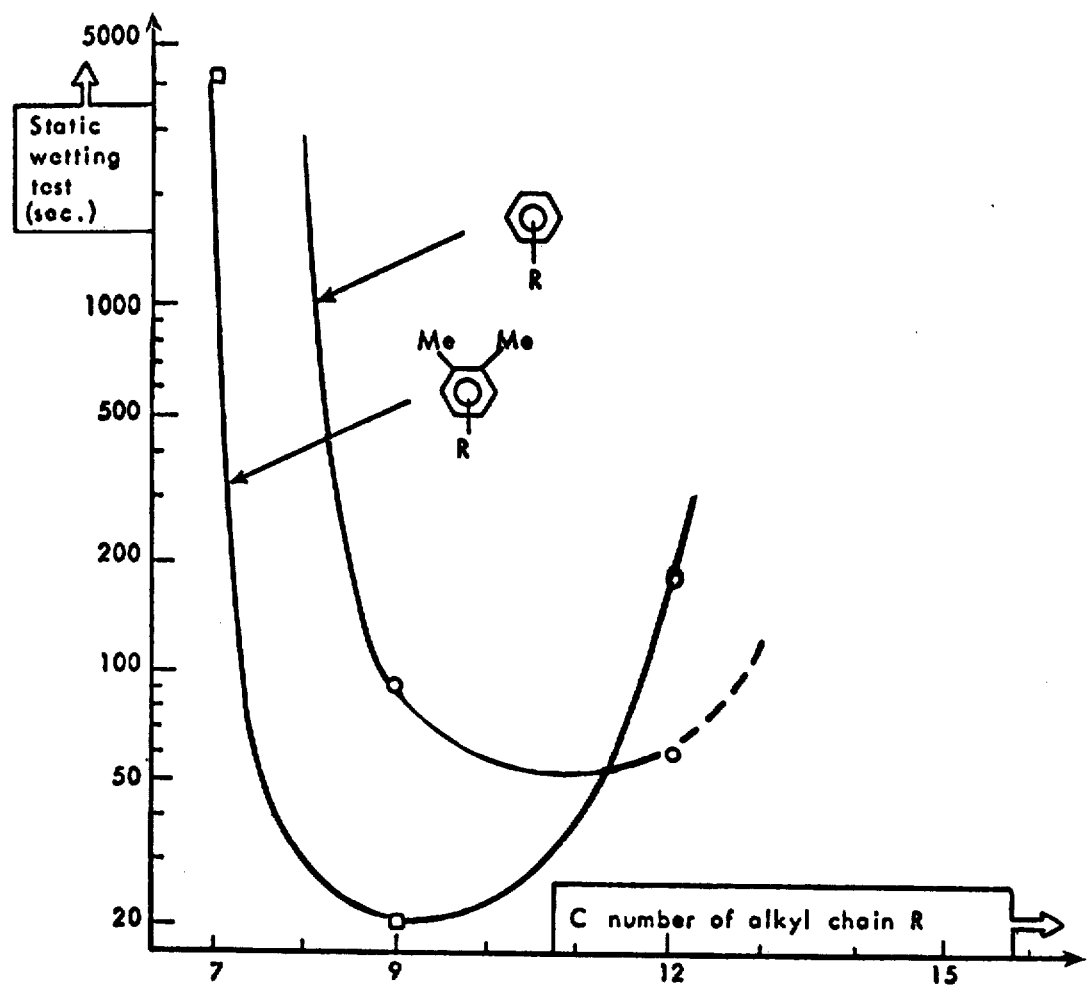
FIG. 1 is a graph showing the variation in static wetting time with the number of carbons in the alkyl substituent.

The invention also provides a process for laying dust comprising spraying the dusty area with a formulation comprising water containing up to 2% by weight of a salt of an alkyl orthoxylene sulphonic acid in which the alkyl group contains from 8 to 11 carbon atoms.

The salt of the alkyl orthoxylene sulphonic acid is of the general formula

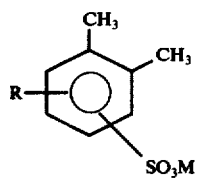

where R is an alkyl group containing from 8 to 11 carbon atoms and M is an organic or inorganic cation. For example M may be an alkali metal such as sodium or potassium or a nitrogenous base such as a quaternary ammonium or quaternary amino which may for preference be ethoxylated. We find that when laying dust in coal mines the wetting power of aqueous solutions containing the alkyl orthoxylene sulphonates is significantly better when the alkyl group contains from 8 to 11 carbon atoms than solutions in which the alkyl group contains fewer than 8 or more than 11 carbon atoms. In addition we find that the compositions containing sulphonates based on alkyl orthoxylene sulphonates have significantly better wetting power than compositions based on the corresponding alkyl benzene sulphonates so that weaker solutions may be used.

The sulphonates are readily soluble in water so the dust laying solutions may be obtained by simple mixing. It is also not necessary to employ any special techniques to apply the sulphonates to the dusty areas for example the sprinkling techniques currently used in coal mines are suitable.

The choice of sulphonate and the amount that is used will depend upon the nature of the dust to be laid. The alkyl group R of the general formula may be straight chain or branched although we prefer the branched chain compounds. We also find that solutions containing an alkyl orthoxylene sulphonate in which the alkyl group contains nine carbon atoms is especially useful for laying dust in coal mines. This also has the advantage that the alkyl orthoxylene from which the sulphonate is derived may be prepared by conventional alkylation of orthoxylene with a propylene trimer. The alkylorthoxylene may then be sulphonated to produce the sulphonic acid by any of the well known standard sulphonation techniques and the acid neutralised to give the appropriate sulphonate. We prefer to use as little of the sulphonate as possible to achieve the desired wetting effect since this is economically desirable. We find that in most instances no more than 1% by weight of the sulphonate in water is sufficient and our preferred formulations contain from 500 to 5000 parts per million of the sulphonate. The amount of sulphonate that should be used will however depend upon the nature of the dust to be laid.

The present invention is illustrated but in no way limited by the following examples in which the wetting power of the formulation was determined by the static Wetting Test in which the time for 1 gram of the coal dust in the shape of a cone to sink into the formulation is measured. In the test the dust laying formulation is introduced to the bottom of a glass filtering funnel through a filter and connecting tube and the cone of the coal dust is laid on the filter funnel so that it is lifted from the filter by the formulation as it flows into the funnel. The wetting time is the time taken for all the dust to sink into the formulation, the quicker the dust sinks the greater the wetting power.

In our specific tests the sulphonate was added to the water and the solution allowed to stand for 24 hours. The solution was then preheated to 25 ± 1° C and then added quickly to the coal dust in the manner described above.

In these examples the wetting power of the compositions was determined in relation to coal dust from the French Dauphine mines and each formulation was tested three times and the wetting time taken as the average of the three.

EXAMPLE 1

The static wetting time of solutions containing 0.1% by weight of sodium orthoalkyl xylenes sulphonates containing 7, 9 and 12 carbon atoms in the alkyl groups were compared with similar solutions containing the corresponding sodium alkyl benzene sulphonates and the results are set out in FIG. 1.

EXAMPLE 2

Figure 2:
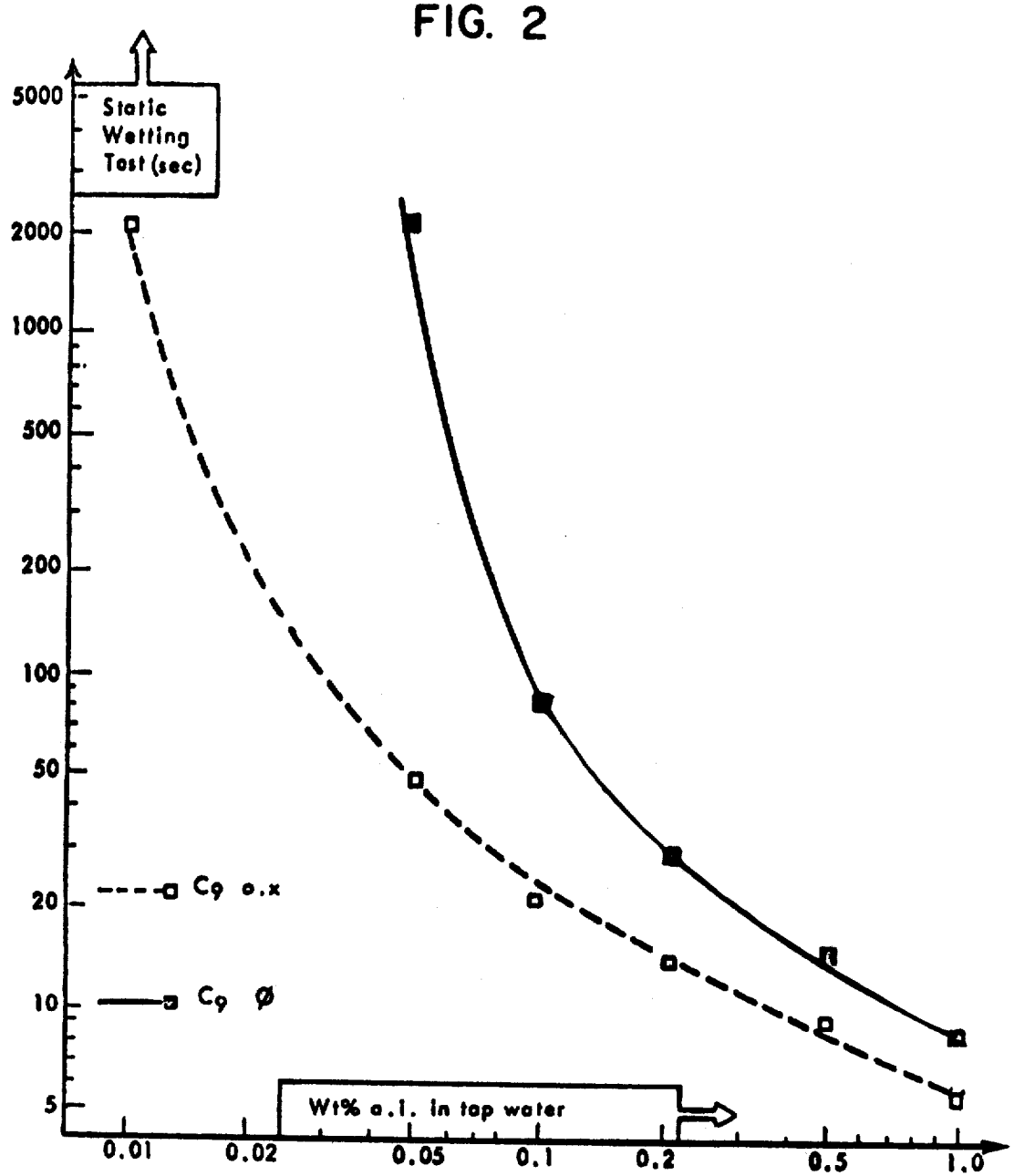
FIG. 2 is a graph showing the variation in static wetting time with the weight percent active ingredient (a.i.) of $C_9$ alkyl orthoxylene ($C_9$ o.x.) sulfonate and $C_9$ alkyl benzene sulfonate ($C_9$ $\phi$).

The static wetting time of solutions containing varying amounts of the $C_9$ alkyl orthoxylene sulphonate used in Example 1 was compared with solutions containing similar amounts of the $C_9$ alkyl benzene sulphonate of Example 1 and the results are set out in FIG. 2.

We claim:

1. A formulation for laying dust comprising water containing up to 2% by weight of a water-soluble salt of an alkyl orthoxylene sulphonic acid in which the alkyl group contains from 9 carbon atoms.

2. A formulation according to claim 1 in which the cation of the salt is an alkali metal.

3. A formulation according to claim 1 containing from 500 to 5000 parts per million of the sulphonate.

4. A process for laying dust comprising spraying the dusty area with a formulation according to claim 1.

5. A process for laying coal dust comprising spraying said dust with the formulation of claim 2.